(12) United States Patent
Ganz et al.

(10) Patent No.: US 6,530,777 B1
(45) Date of Patent: Mar. 11, 2003

(54) INJECTION MOULDING MACHINE WITH INTEGRATED HOT CHANNEL SYSTEM

(75) Inventors: Martin Ganz, Katzeldorf (AT); Paul Sillman, Gerlafingen (CH)

(73) Assignee: Ettlinger Kunststoffmaschinen GmbH, Koenigsbrunn (DE)

( * ) Notice: Subject to any disclaimer, the term of this patent is extended or adjusted under 35 U.S.C. 154(b) by 0 days.

(21) Appl. No.: 09/029,033

(22) PCT Filed: Aug. 22, 1996

(86) PCT No.: PCT/CH96/00290

§ 371 (c)(1),
(2), (4) Date: Jul. 8, 1999

(87) PCT Pub. No.: WO97/07960

PCT Pub. Date: Mar. 6, 1997

(30) Foreign Application Priority Data

Aug. 23, 1995 (CH) ................................................ 2405/95

(51) Int. Cl.⁷ .............................................. B29C 45/02
(52) U.S. Cl. ...................... 425/557; 425/559; 425/561; 425/572
(58) Field of Search .................. 425/557, 558, 425/559, 561, 564, 572

(56) References Cited

U.S. PATENT DOCUMENTS 3,723,037 A * 3/1973 Formo ........................ 425/139
5,770,246 A * 6/1998 Fujikawa ..................... 425/557
5,773,038 A * 6/1998 Hettinga ..................... 425/572

FOREIGN PATENT DOCUMENTS

| DE | 1579101 | * | 1/1970 |
| DE | 2027514 | * | 12/1970 |
| FR | 1339308 | * | 11/1962 |
| FR | 2549770 | * | 7/1983 |
| GB | 1107939 | * | 3/1968 |
| JP | 59-222323 | * | 12/1984 |

OTHER PUBLICATIONS

Plastiques Modernes et Elastomeres, Jan./Feb. 1983, p. 41.*

* cited by examiner

Primary Examiner—Tim Heitbrink
(74) Attorney, Agent, or Firm—Nath & Associates PLLC; Gary M. Nath; Marvin C. Berkowitz

(57) ABSTRACT

An injection moulding machine for producing small plastic components with a drive unit (6, 84), a plasticizing device (4, 42) and a hot channel nozzle (1) having a collection chamber (10) for the molten plastic. An injection ram (35) projects into the hot channel nozzle (1) and can push the collected plastic out. In an embodiment, the plasticizing device (4, 42) and the drive unit (6, 84) are secured to a movable bearing housing (85) and can move the injection ram (35).

10 Claims, 6 Drawing Sheets

INJECTION MOULDING MACHINE WITH INTEGRATED HOT CHANNEL SYSTEM

FIELD OF THE INVENTION

The present invention relates to an injection moulding machine for injection moulding of plastic miniature parts.

BACKGROUND OF THE INVENTION

Such injection moulding machines are generally known and basically comprise an injection aggregate and a closure arrangement for the form tools, whereby the injection aggregate has an extruder for plasticizing the synthetic material and a collection chamber for the plasticized mass, which is either ejected by an axial movement of the extrusion screw or by a separate injection ram out of the injection nozzle of the extruder. The form tools with their cavities are clamped between two clamping plates of the closure unit, whereby the injection nozzle of the extruder, during ejection of the plasticized mass, tightly contacts the die plate of the injection moulding machine by pressure of force.

In these machines, the melted material is pressed from the collection chamber of the extruder over feed or sprue channels arranged in a hot channel distributor into the cavities and, as a rule, molten material for a number of injection cycles is in the feed path between the collection chamber and the cavity. This material is subjected to repeated, abrupt compressions and accompanying temperature fluctuations over a period of time, and therefore, by the time it is filled into the cavities, the material already exhibits a reduction in quality or even particles of decomposition products. It is understood that products made with such material may exhibit faults or early fatigue symptoms.

A further and to date unsolved problem in the production of small parts is to be seen in the large quantity of sprue pieces occurring. Conventionally produced small parts always have a sprue piece, the weight of which can be well in excess of that of the part being produced, and which must be removed in a separate work step.

In this way, production with needle-free nozzle-closure devices can result in approx. 95% of the injected material being waste material and usable parts being produced from a mere 5% of the injected material. Even if this waste material is recycled into the plasticizing process, the characteristic properties of the respective plastics suffer and the miniature parts produced with this material no longer are able to completely meet the requirements expected from them.

In order to reduce the problem associated with hot channel distributors, DE-A-42'39'776 suggests providing an injection moulding machine for the simultaneous production of two miniature plastic parts, in which the injection arrangement is provided with two injection aggregates. In such a device, the plasticizing, the injection process and the post-pressure control are individually carried out for each miniature part to be produced, in order to reach the quality required for these parts with minimal production losses. In the production of high quality miniature parts it has proven particularly difficult to manufacture a number of forms simultaneously and within the required low permissible deviation, i.e. without intrinsic tension or production error and with precise filling weight.

It is therefore the object of the present invention to provide an injection moulding machine for producing qualitatively impeccable, wear resistant and durable parts, preferably miniature parts made of technical plastics, such parts being produced with as little waste as possible.

An arrangement described in the publication "Plastiques Modernes et Elastomères", Vol. 35, Nr. 1, January/February 1983, Paris, France, Page 41, has a distribution block, which—in contrast to conventional injection moulding machines—is fixedly connected to the machine part. This distribution block bears on its front side, i.e. towards the form dies of the injection die a plurality of fixedly mounted injection nozzles which protrude into the first form plate of the injection moulding die. When filling the form cavities, these nozzles, which are fixedly connected to the distribution block and are hot, are brought into contact with the closed and cold injection moulding die via a plurality of infeed channels. After filling the form cavities, the cold die is separated from the hot distribution block and its nozzles. In this way the individual nozzles can again be brought up to the required high temperature, whilst the injection moulded parts can remain in the closed die in order to continue cooling, prior to opening the die for removing the injection moulded parts. The collection chamber of this assembly is located in the machine part, which has proven to be disadvantageous for the production of miniature parts because of the length of the injection channels. At this point it should be stressed that when producing miniature parts, a long retention time of the melt in the hot infeed channels leads to material decomposition.

It is therefore the object of the present invention to provide an injection moulding machine for producing qualitatively impeccable, wear resistant and durable parts, preferably miniature parts made of technical plastics, such parts being produced with as little waste as possible.

Miniature parts such as can be manufactured with the injection moulding machine according to the present invention, normally have a weight of between 0.001 grammes to 5 grammes. However, it is to be understood that parts with a weight of up to 50 grammes or more can be produced.

SUMMARY OF THE INVENTION

This task is inventively solved with an injection moulding machine with the characteristics of claim 1, and in particular with a machine in which the retention time of the plasticized, compressed hot plastics material in the collection chamber (also called piston tab or screw tab) is lowered by a shortening of the injection path of the melt. In particular, this shortening of the injection path is achieved by arranging the collection chamber immediately behind the outlet port of the nozzle tip.

In a first embodiment of the invention, the melt which is produced in a plasticizing cylinder is transported over a hot channel adapter into a nozzle body and is collected in a collection chamber within the nozzle body. The ready melt in this collection chamber is ejected with the aid of a piston and is pressed via injection channels into the cavities. In this embodiment, the ejection piston has an axial core (piston internal feed channel) having a lateral inlet port through which the melt is fed into the collection chamber, and also a ball valve at its tip, which closes off the collection chamber during ejection. The outlet port of the injection channels are closed or opened by means of a needle closure device.

In another embodiment of the invention, the melt is produced directly behind the hollow cylinder type ejection plug and is transported axially through this hollow cylindrical plug into the collection chamber (plug tab). Again, the collection chamber in the nozzle body can be closed off towards the feed or transportation channel of the hollow cylindrical plug, and the outlet ports of the nozzle tip can be sealed of with a needle shut-off device.

In a further embodiment of the invention, the melt is not fed through the piston itself, but is directly fed into the collection chamber. A sliding arrangement which is coupled to the needle closure device allows the collection chamber to be automatically closed off from the feed channel.

The advantages of the inventive injection moulding machine are immediately obvious for the man skilled in the art. Thus, the shortening of the injection path permits a more controlled increase in pressure in the cavity and enables an exactly dosed filling of the cavity with hot melt, which leads to injection moulded parts with little production tolerance (deviation from permissible value). Of course, with such a machine the cavities can be filled rapidly requiring only a low machine filling pressure. Energy savings and little wear and tear are further advantages of this shortened injection path.

BRIEF DESCRIPTION OF THE DRAWINGS

In the following the invention shall be more closely described with the aid of an embodiment and the Figures, in which.

DETAILED DESCRIPTION OF THE PREFERRED EMBODIMENT

Figure 1:
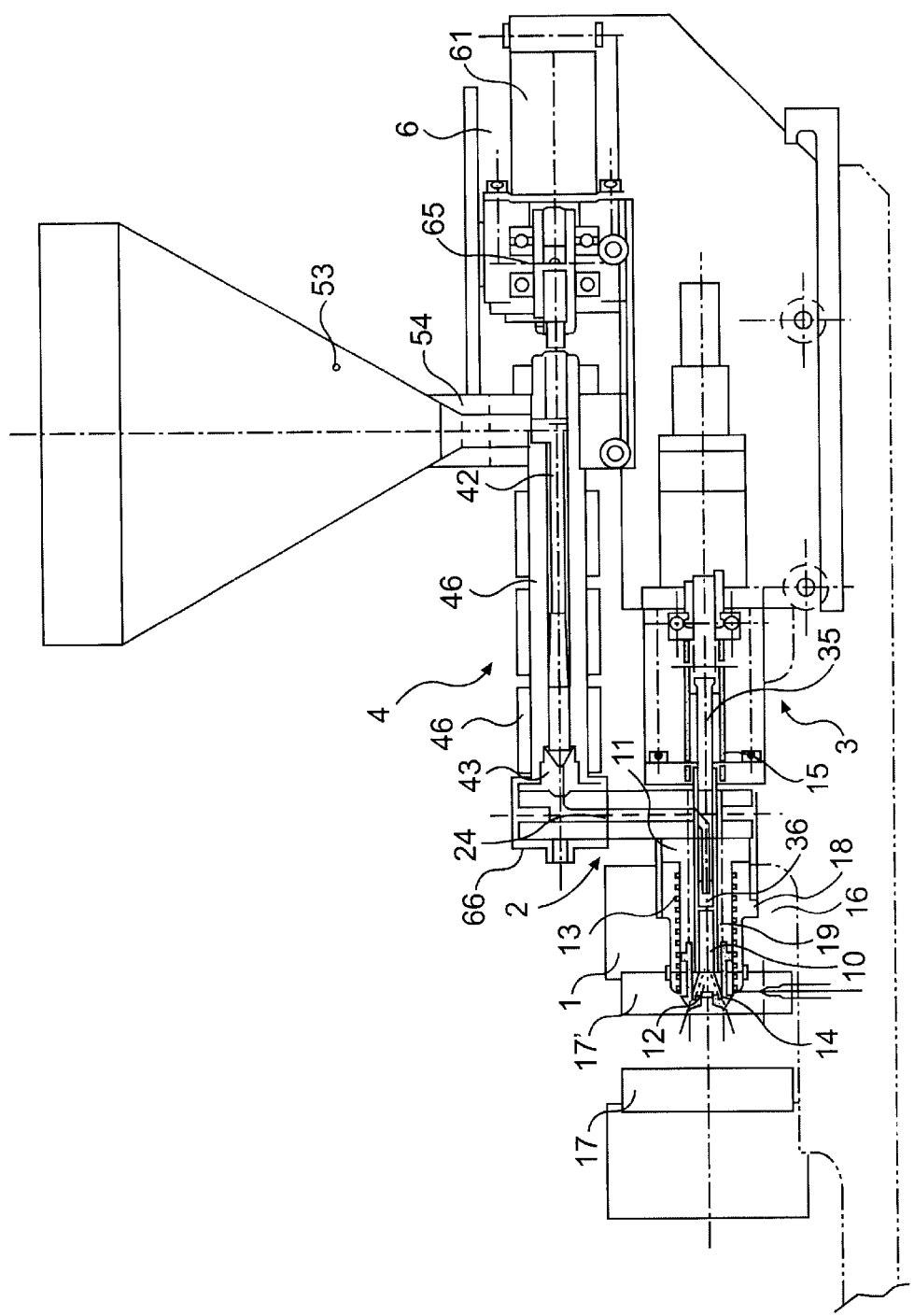
FIG. 1 shows a schematic view of a first embodiment of an inventive injection moulding machine in cross section.

The injection moulding machine shown in FIG. 1 comprises a drive unit 6, a plasticizing device 4, in particular a plasticizing cylinder, a hot channel adapter 2, a piston and needle closure drive 3, as well as an inventive hot channel nozzle 1 as the basic assemblies. In operation, the plastic granules to be processed are fed from the granule container 53 through the granule feed channel 54 into the cylinder tube 41. The plasticizing screw 42 lying in the cylinder tube 41 is driven by a drive motor 61 via a screw coupling 65. The cylinder tube 41 is heated by means of known ring heating elements 46 and is mounted on an adapter 43 at its outlet side. This adapter 43, in combination with a clip 66, ensures a pressure-tight connection to the hot channel adapter 2, through which the plasticized material is fed into a collection chamber 10. According to the invention, this collection chamber 10 lies in the hot channel nozzle 1. The material collected in the collection chamber 10 can be directly pressed into the cavities of the forming tool through the nozzle tip 12 of the hot channel nozzle 1. The injection ram 35 is carried in a guiding and wear insert 19 and, in the embodiment shown, has a central bore whose end towards the drive has an inlet opening and whose outlet opening at the end towards the tool has a back-pressure valve, for example a ball valve. According to the invention, the injection ram 35 protrudes into the nozzle body 11 of the hot channel nozzle 1, which nozzle is heated with the aid of nozzle heating elements 13 and which ram bears a nozzle tip 12. This nozzle tip 12 has one or more injection channels with outlet openings which lead to the inlet openings of the individual cavities. In the shown and preferred embodiment, these outlet openings are axially displaced to the injection ram 35 in order to be able to guide the closure needles 15 outside of the guiding insert of the injection ram 35.

In a first operational phase the plasticized material, and in particular technical plastics such as PET, ABS, PIC or similar, to fed through the material feed channel 24 of the hot channel adapter 2 in to the inlet opening of the injection ram bore and further on through the opened back-pressure valve 36 into the collection chamber 10 and the injection channels, whose injection openings are closed by means of the closure needles 15. In this way, as much material is provided as is necessary for filling the respective cavities.

In a second phase the closure needles 15 are withdrawn in order to release the injection openings; then the required pressure is built up by means of the injection ram 35 in order to press the material combined in the collection chamber 10 into the cavities of the die plates 17. According to the invention, the correct pressure for uniform distribution and precise filling of the material is built up directly in the cavities. Due to the forward motion of the injection ram 35 the back-pressure valve is closed and the prescribed quantity of material is pressed into the cavities. After filling is completed the injection openings are closed by means of the closure needles 15. The retreating movement of the injection ram 35 automatically causes the back-pressure valve to be relieved and, due to the feed pressure of freshly plasticized mass, to be reopened. The control of the individual components is within the scope of the person skilled in the art and is not subject of the present invention.

Figure 2:
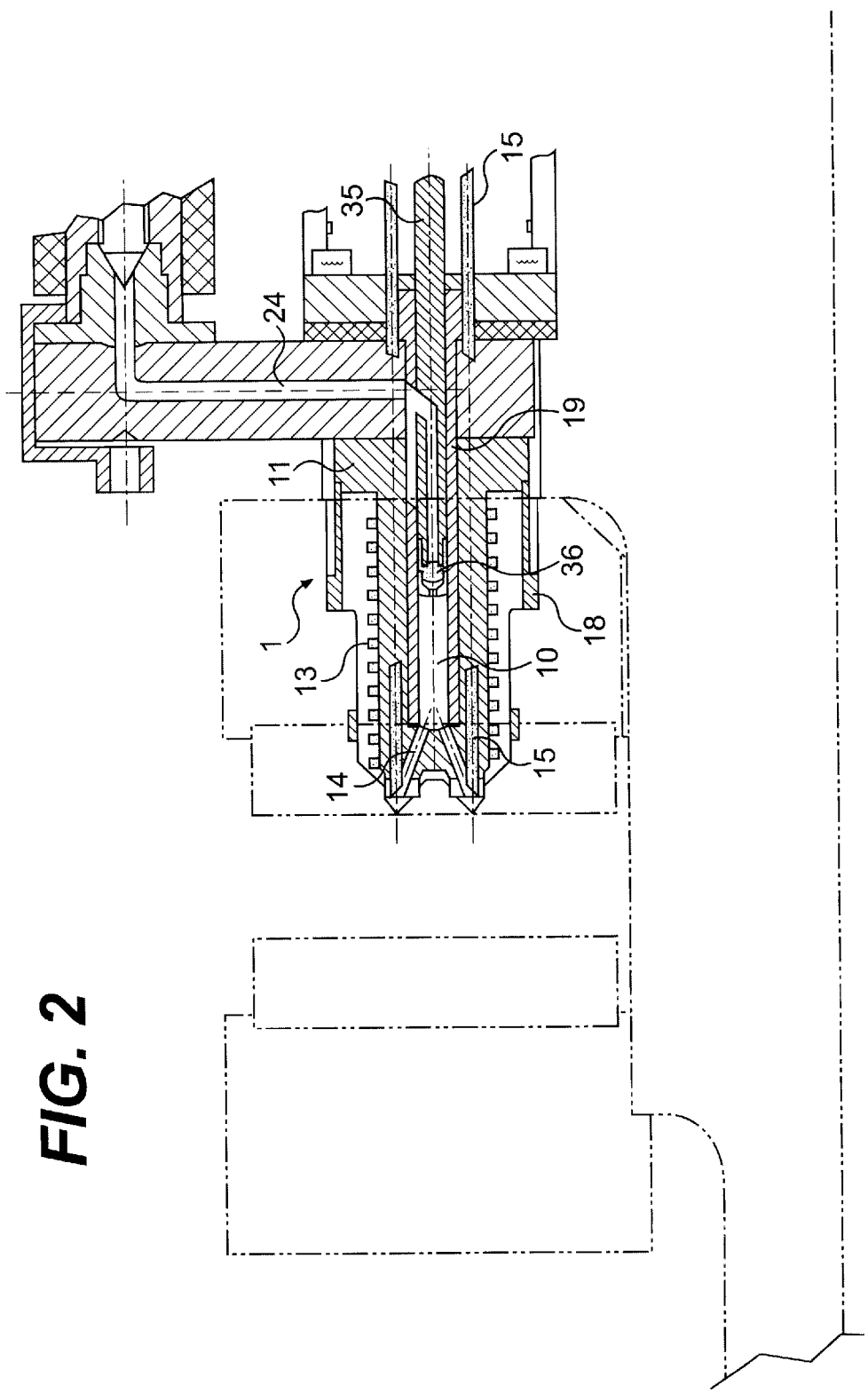
FIG. 2 shows a schematic view of the accompanying hot channel nozzle in cross section.

FIG. 2 shows the inventive hot channel nozzle 1 in detail. This comprises a nozzle body 11 with a collection chamber 10 arranged therein. By means of heating elements 13 this nozzle body 11 can be brought up to or stabilized at the temperature required for processing. In a preferred embodiment, the nozzle body 11 has a length of approx. 120 mm and a diameter of approx. 35 mm. The collection chamber 10 has a diameter of approx. 10 mm. Preferably the nozzle body 11 is made of one single piece, but can have a separate nozzle tip 12 being made of a different material. In the present embodiment there are four injection channels 14 which can be closed or opened by means of needles 15 of the needle closure device. According to the invention, the nozzle tip of the hot channel nozzle 1 protrudes through the machine side die plate 17' and pressure-tightly abuts the cavity-forming die plate surface.

The injection ram is hollow on the side facing the cavities and on the side facing the machine it has a lateral inlet opening, over which the plasticized plastic melt can be transported from the plasticizing device into the collection chamber 10. A back-pressure valve 36 prevents the plastic melt from flowing back out of the collection chamber 10 into the bore 24 of the injection ram 35 during its forward movement. A guiding and wear sleeve (19) supports the leakage-free pressing of the plastic mass out of the collection chamber 10. In order to be able to melt and transport plastic material also during the pressing-out phase, the guiding and wear sleeve 19 has a free groove 18, over which the machine side inlet opening of the injection ram's central bore remains connected to the material feed channel 24.

Figure 3:
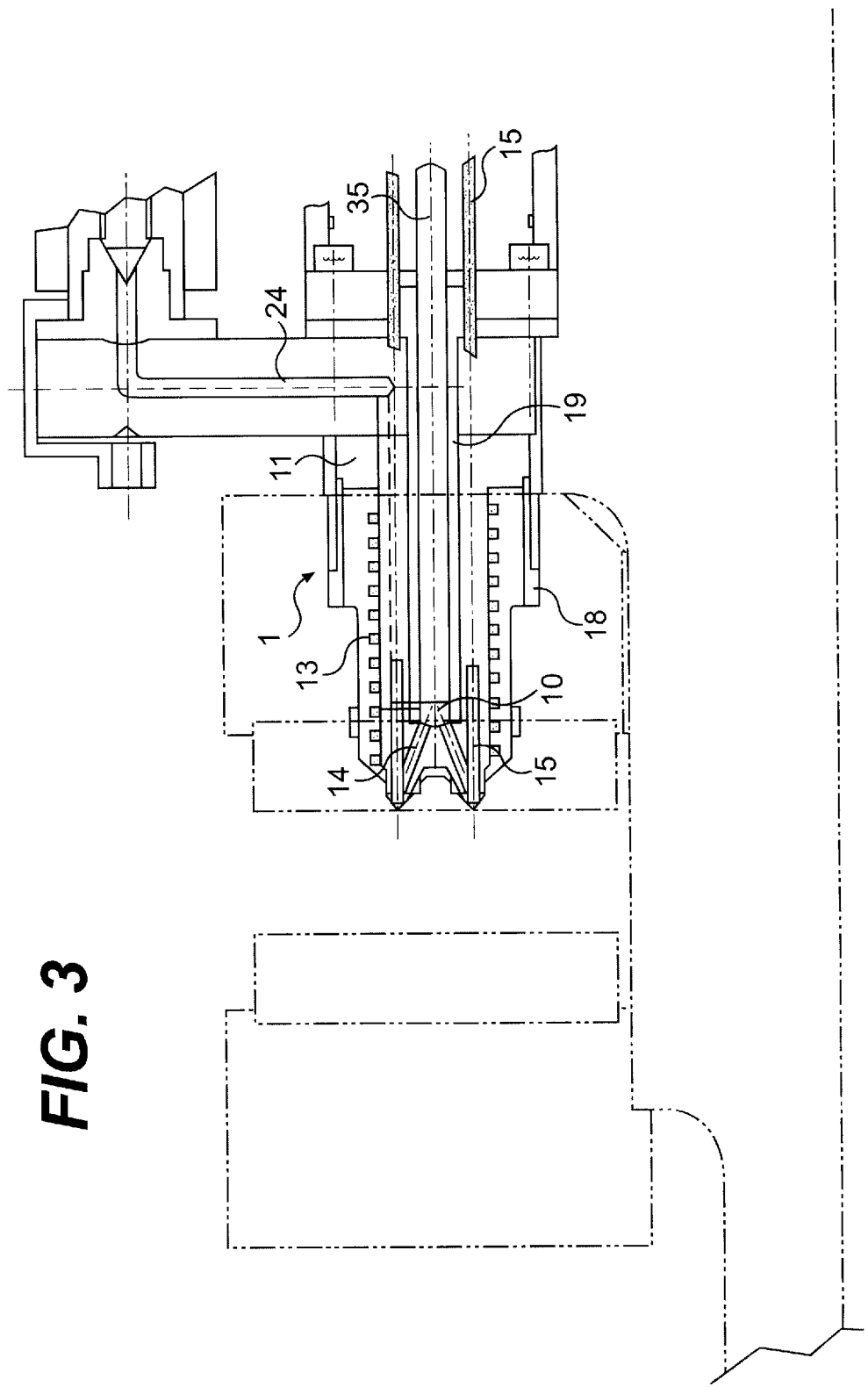
FIG. 3 shows a schematic view of a constructional variation of this injection moulding machine in cross section.

It is to be understood that the construction of the inventive injection moulding machine can be adapted to known plasticizing devices and pressure-generating pressing means. FIG. 3 shows a further embodiment, in which the material feed channel 24 is directly connected to the injection channel side end of the collection chamber 10. In this constructional variation, an injection ram with back-pressure valve is not required and the collection chamber 10 can be directly closed off from the material feed channel 24 by means of a slide coupled to the needle closure device. Preferably, instead of employing passive valve systems, actively operatable, i.e. controllable closure means can be used, thereby allowing for an even more precise dosing of the plastic mass to be injected.

Figure 4:
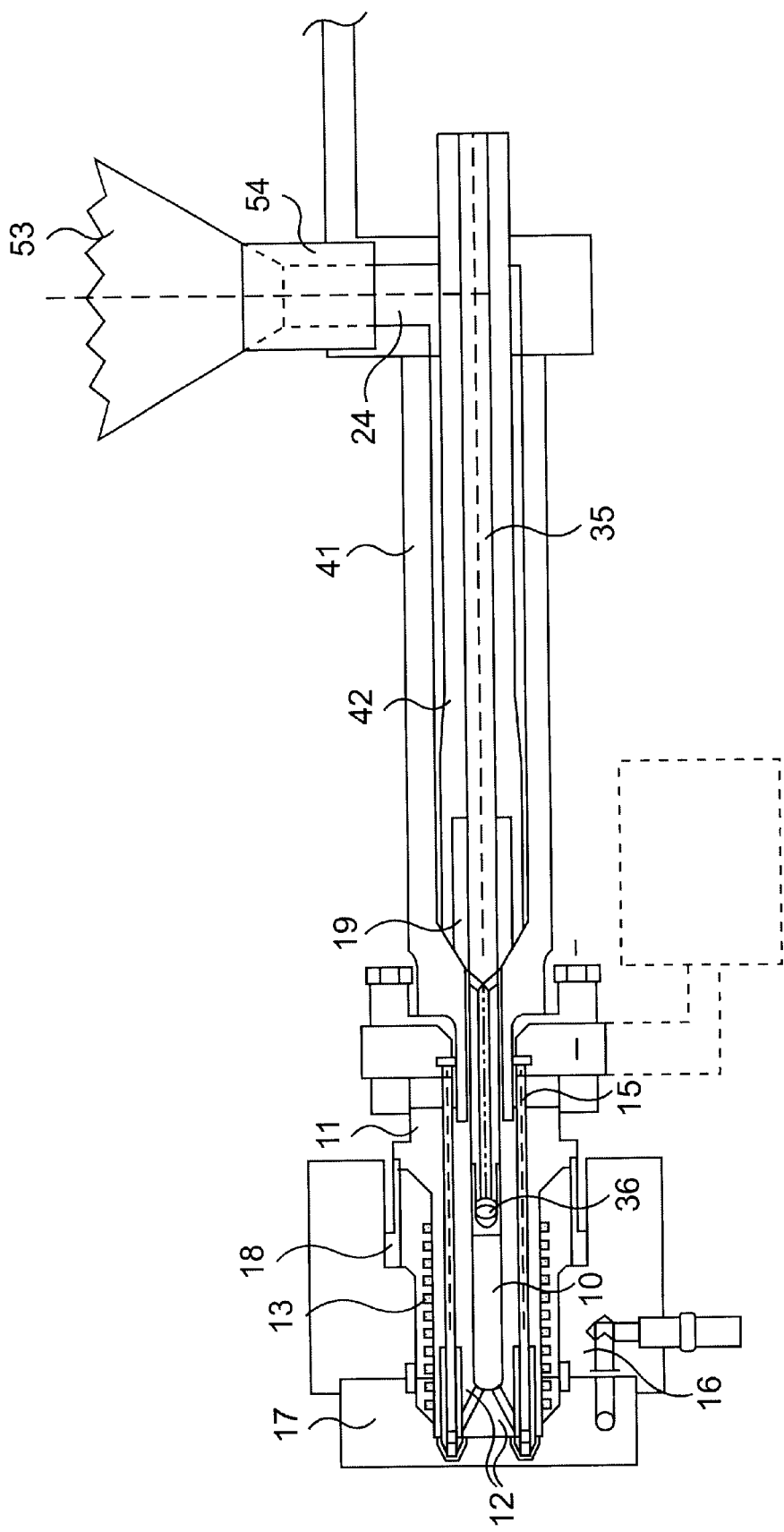
FIG. 4 shows a schematic view of a further embodiment of the inventive injection moulding machine in cross section.

In the embodiment as shown in FIG. 4, the plasticizing device and the pressure-generating means for ejecting the plastic material resting in the collection chamber 10 are arranged axially behind each other. The construction of the inventive hot channel nozzle 1 essentially corresponds to that as shown in FIG. 2. However, the ram 35 in this embodiment is guided axially through the plasticizing screw 42.

Figure 5:
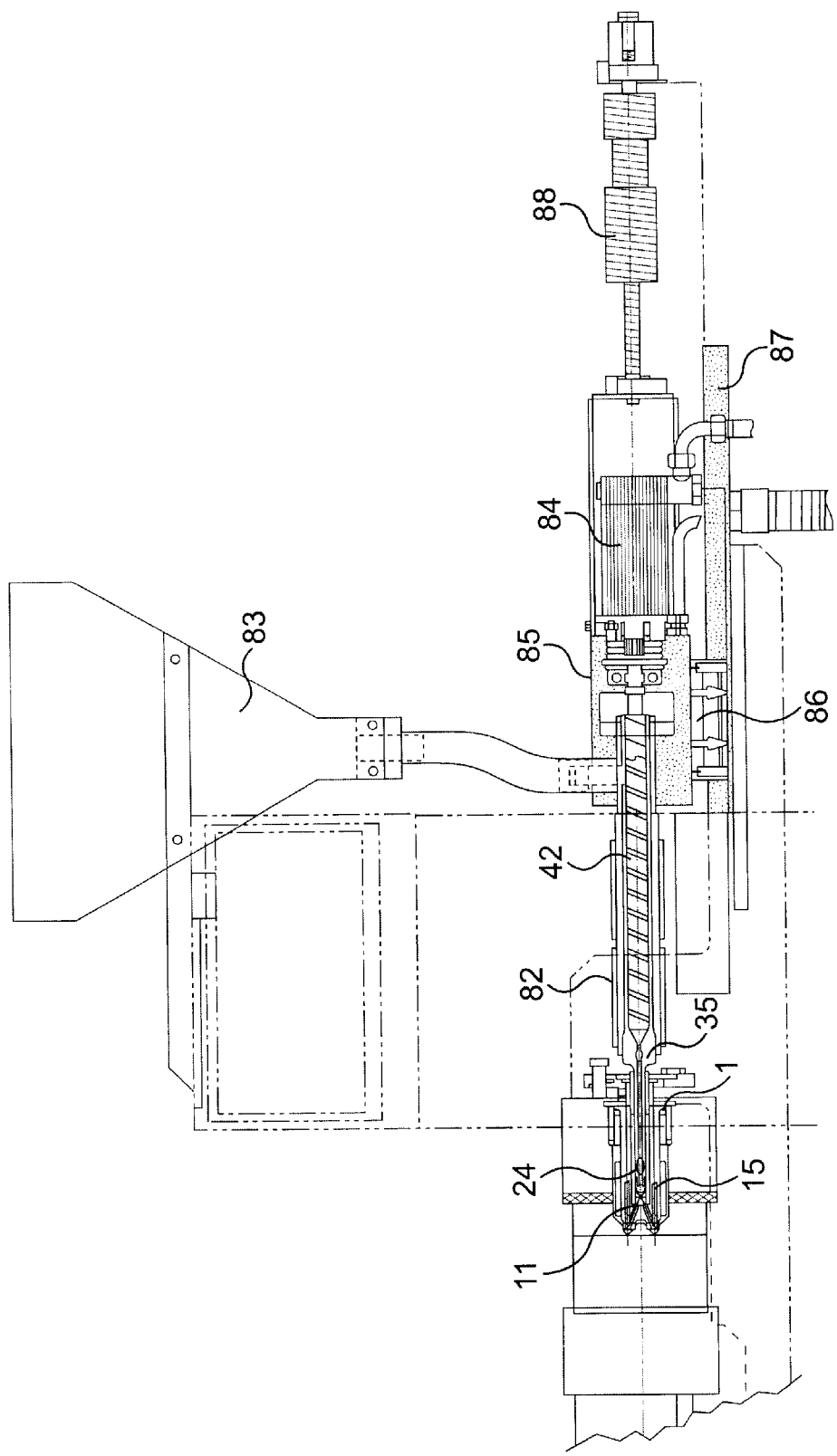
FIG. 5 shows a detailed view of this further embodiment of the inventive injection moulding machine in cross section.

In the embodiment as shown in FIG. 5, the plasticizing screw 42 and the hot channel nozzle 1 lie axially behind each other. For this purpose, the injection ram 35 is provided with a material feed channel 24, and in particular a central bore. The screw 42 is guided in a heatable cylindrical tube 82 and is provided with the required plastic material out of a granule hopper 83. This plasticizing screw 42 is driven by a drive motor 84 and is attached to a supporting frame 85 together with the cylindrical tube 82. This supporting frame 85 has a guiding carriage 86 which is slidingly supported on a guiding rail 87. By means of a pneumatic drive 88 the supporting frame 85 can be displaced on this guide rail 87 together with the drive motor 84, the cylindrical tube 82 and the injection ram 35. When the collection chamber 10 is being filled with plasticized synthetic material the supporting frame 85 is pushed back on the guide rail 87 together with the plasticizing screw 42 and the drive motor 84. In order to empty the filled collection chamber 10, closure needles 15 are withdrawn and the pneumatic drive 88 is activated. Typically, the collection chamber has a diameter of 6–12 mm and a length of 100–150 mm. In the present embodiment the needle closure plate 89 for activating the needles is arranged directly behind the hot channel nozzle 1 and needles having a length of 100–120 mm can be used.

Figure 6:
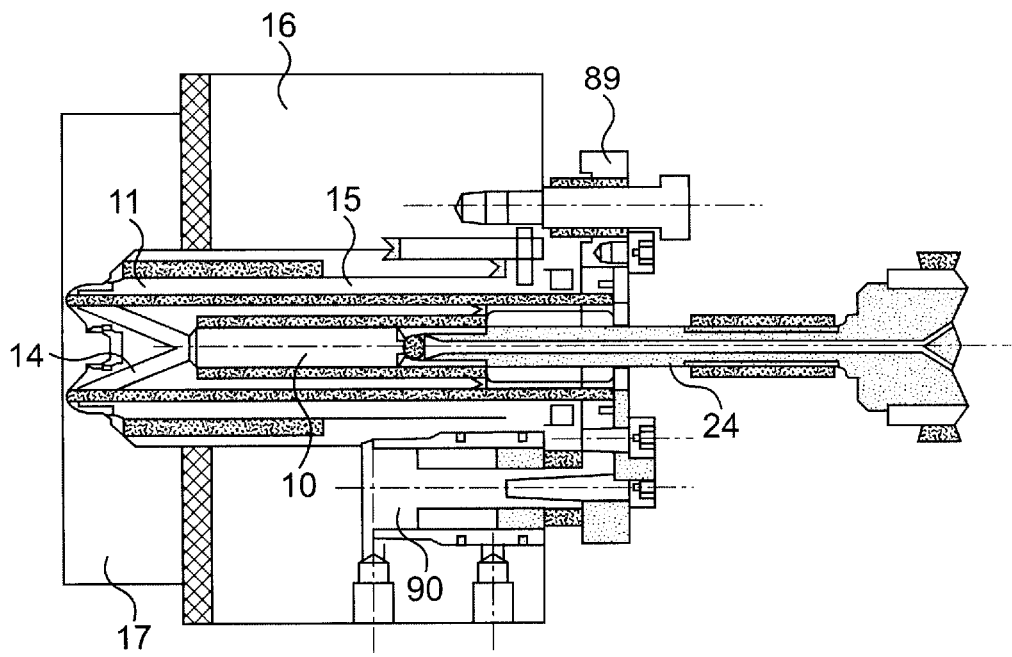
FIG. 6 shows a detailed view of the hot channel nozzle of the embodiment according to FIGS. 4 and 5 in a filled state.

FIG. 6 shows the nozzle body and the guiding mechanism of the closure needles in detail. The nozzle body 11 is rigidly fixed in the fixed forming plate 16 and on the sprue side protrudes into the die mould 17. This nozzle body 11 can comprise one or more injection channels 14 which can be closed with closure needles 15. These closure needles 15 are collectively attached to a closure needle plate 89 which can be displaced over a piston-pressure-system. 90. During the plasticizing step the plastic flows into the injection channels 14 and to the collection chamber 10. Thereby the injection ram 35 is pressed outwards together with the cylindrical tube 82, the plasticizing screw 42 and the drive motor 84.

Figure 7:
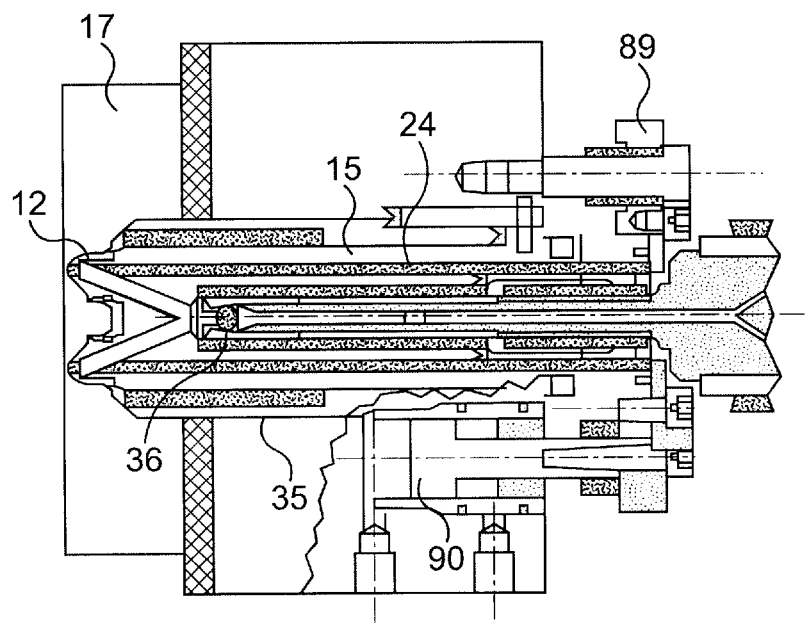
FIG. 7 shows a detailed view of the hot channel nozzle of the embodiment according to FIGS. 4 and 5 in an emptied state.

As shown in FIG. 7, in order to fill the die cavities the needle closure plate 89 is pushed backwards with the aid of the piston-pressure-system 90, and thereby withdrawing the closure needles 15 from the openings of the nozzle tip 12. At the same time the injection ram 35 is pushed into the collection chamber 10, together with the plasticizing screw 42 being attached in the supporting frame 85. A back-pressure valve 36, and in particular a ball valve, closes the central bore 24 of the injection ram 35, thereby permitting an exactly dosed filling of the die cavities.

By means of the present invention, machine hot channel distributors are no longer required and the total retention time in the injection channels of the plastic mass which is heated up to approx. 500° C. can be reduced to two cycles. Additionally, the design of the individual tools is extremely simplified because, for example, hot channels and needle closure are no longer required.

It is to be understood that the embodiments herein described only serve to illustrate the invention and can be modified by the expert without requiring a further inventive step. Thus, instead of the piston, a screw with injection head, or instead of the back-pressure valve an adjustable or automatic pressure valve can be installed. Also, for closure of the nozzle tip channels a gate or other types of valves can be used. The inclusion of ventilation channels and specific seals, as well as temperature regulation and control of the individual machine parts is also within the scope of the common knowledge of the expert. It is also be to understood that the injection moulding machine can be dimensioned so as to be suitable for producing larger parts.

What is claimed is:

1. Injection moulding machine for injection moulding of plastic parts, with a plasticizing device for plasticizing plastic granules, having a collection chamber for plastic material plasticized in the plasticizing device, having a material infeed channel between the plasticizing device and the collection chamber, and having an injection ram for ejecting plastic material collected in the collection chamber, characterized in that the injection moulding machine comprises a hot channel nozzle having at least one injection channel and that the collection chamber lies within this hot channel nozzle, said hot channel nozzle protruding through a die plate.

2. Injection moulding machine according to claim 1, characterized in that the hot channel nozzle comprises a nozzle body and a removable nozzle tip.

3. Injection molding machine according to claim 1, characterized in that the injection ram comprises a bore having a drive oriented end and a machine oriented end, wherein said drive oriented end has at least one lateral inlet opening and said machine oriented end has a back-pressure valve.

4. Injection molding machine according to claim 3, characterized in that the back-pressure valve is a ball valve.

5. Injection molding machine according to claim 3, characterized in that the injection ram is in a guiding and wear sleeve.

6. Injection moulding machine according to claim 1, characterized in that for closure of the at least one injection channel a needle closure device is provided.

7. Injection molding machine for injection moulding of plastic parts, with a plasticizing device for plasticizing plastic granules, having a collection chamber for plastic material plasticized in the plasticizing device, having a material infeed channel between the plasticizing device and the collection chamber, and having an injection ram for ejecting plastic material collected in the collection chamber, characterized in that the injection moulding machine comprises a hot channel nozzle having at least one injection channel and that the collection chamber lies within this hot channel nozzle, said hot channel nozzle protruding through a die plate, and wherein the material infeed channel opens into a region of the collection chamber adjacent thereto.

8. Injection molding machine for injection moulding of plastic parts, with a plasticizing device for plasticizing plastic granules, having a collection chamber for plastic material plasticized in the plasticizing device, having a material infeed channel between the plasticizing device and the collection chamber, and having an injection ram for ejecting plastic material collected in the collection chamber, characterized in that the injection moulding machine comprises a hot channel nozzle having at least one injection channel and that the collection chamber lies within this hot channel nozzle, said hot channel nozzle protruding through a die plate, and wherein an end of the material infeed channel adjacent to the collection chamber is provided with a controlled closure device.

9. Injection molding machine according to claim 6, characterized in that the needle closure device is provided with a pressure piston device.

10. Injection molding machine according to claim 9, characterized in that the needle closure device is arranged between the hot channel nozzle and the plasticizing device.

* * * * *